(12) United States Patent
Ajgaonkar

(10) Patent No.: US 12,444,167 B2
(45) Date of Patent: Oct. 14, 2025

(54) AUTOMATED COLLECTION OF PRODUCT IMAGE DATA AND ANNOTATIONS FOR ARTIFICIAL INTELLIGENCE MODEL TRAINING

(71) Applicant: Insight Direct USA, Inc., Tempe, AZ (US)

(72) Inventor: Amol Ajgaonkar, Chandler, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 567 days.

(21) Appl. No.: 17/961,230

(22) Filed: Oct. 6, 2022

(65) Prior Publication Data

US 2024/0119702 A1    Apr. 11, 2024

(51) Int. Cl.
G06N 20/00    (2019.01)
G06N 5/04    (2023.01)
G06V 10/764    (2022.01)

(52) U.S. Cl.
CPC ............. *G06V 10/764* (2022.01); *G06N 5/04* (2013.01); *G06N 20/00* (2019.01)

(58) Field of Classification Search
None
See application file for complete search history.

(56) References Cited

U.S. PATENT DOCUMENTS

| | | |
|---|---|---|
| 11,080,918 B2 | 8/2021 | Chen et al. |
| 2020/0320345 A1 | 10/2020 | Nikolenko et al. |
| 2020/0320769 A1* | 10/2020 | Chen .................... G06F 18/214 |
| 2020/0410662 A1 | 12/2020 | Jha et al. |
| 2021/0174145 A1 | 6/2021 | Buibas et al. |
| 2021/0192340 A1 | 6/2021 | Stonehouse et al. |
| 2021/0287040 A1 | 9/2021 | Al-Qunaieer |
| 2021/0350180 A1 | 11/2021 | Oleson et al. |
| 2021/0374391 A1 | 12/2021 | Jorasch et al. |
| 2024/0119724 A1* | 4/2024 | Ajgaonkar ......... G06Q 30/0623 |

FOREIGN PATENT DOCUMENTS

| | | |
|---|---|---|
| AU | 2020104423 A4 | 5/2021 |
| EP | 3750114 A4 | 10/2021 |
| JP | 2015501984 A | 1/2015 |
| WO | 2021197667 A1 | 10/2021 |
| WO | 2021223927 A1 | 11/2021 |

\* cited by examiner

*Primary Examiner* — Dov Popovici
(74) *Attorney, Agent, or Firm* — Kinney & Lange, P.A.

(57) ABSTRACT

A method of obtaining images and data to train an AI model for product detection includes generating, with an image collection system at a first product source, a first annotation package including one or more images of and data about a first product. The first product is placed in a first enclosure located at the first product source. A process for obtaining the one or more images of the first product is initiated in the first enclosure. The one or more images of the first product is obtained with one or more cameras positioned in the first enclosure. The one or more images of the first product is provided to an edge compute device. Data about the first product is input, using an input device, into the edge compute device. An annotation package for the first product is created that includes the one or more images and the data.

18 Claims, 7 Drawing Sheets

AUTOMATED COLLECTION OF PRODUCT IMAGE DATA AND ANNOTATIONS FOR ARTIFICIAL INTELLIGENCE MODEL TRAINING

CROSS-REFERENCE TO RELATED APPLICATION(S)

This application is related to U.S. application Ser. No. 17/961,226, filed concurrently herewith on Oct. 6, 2022, entitled "Automated Artificial Intelligence Model Training Using Product Images," the disclosure of which is incorporated by reference in its entirety.

BACKGROUND

The present disclosure relates to product detection, and in particular, to training and using an AI model for product detection.

Retailers want to track products in their stores for numerous reasons. Namely, retailers want to determine the rate at which products are being sold, the inventory of each product at any given time, and what products need to be ordered and/or stocked. Further, retailers also want to track products as they move through their store, particularly when using cashier-less check out systems.

Retailers have developed their own AI models (and/or computer vision programs) to detect products in their stores. However, due to the large number of products in a single store, it can take a lot of time and resources for retailers to develop their own AI models, as the AI models have to be trained to detect every product in the store. Further, it can take time and resources to constantly retrain the AI models as the retailer's product offerings change and as product sources change the packaging of products. For example, if a retailer has a thousand products in a store, it is likely that at least a few new products will be introduced each week and at least a few new products will have updated product packaging each week. A retailer will need to identify that there are new products or new product packaging, obtain the information needed (for example, images and annotations about the images) to retrain their AI models to detect the new product or product offering, submit that information to the AI models, retrain their AI models, and deploy the retrained AI models to detect the new product or new product packaging. If a retailer isn't constantly retraining their AI models to detect their new product offerings or products with new product packaging, they will not be able to detect every product in their store.

SUMMARY

A method of obtaining images and data to train an AI model for product detection includes generating, with an image collection system at a first product source, a first annotation package including one or more images of and data about a first product. The first product is placed in a first enclosure located at the first product source. A process for obtaining the one or more images of the first product is initiated in the first enclosure. The one or more images of the first product is obtained with one or more cameras positioned in the first enclosure. The one or more images of the first product is provided to an edge compute device. Data about the first product is input, using an input device, into the edge compute device. An annotation package for the first product is created that includes the one or more images and the data. A second annotation package including one or more images of and data about a second product is generated with an image collection system at a second product source. The first annotation package is provided, from the first product source, to a product detector. The second annotation package is provided, from the second product source, to the product detector. An artificial intelligence model is trained to detect the first product based on the first annotation package and to detect the second product based on the second annotation package. The artificial intelligence model is implemented on the product detector. A first image is received at the product detector from a first retailer. The first product and/or the second product is detected, by executing the artificial intelligence model, in the first image. A second image is received at the product detector from a second retailer. The first product and/or the second product is detected, by executing the artificial intelligence model, in the second image.

DETAILED DESCRIPTION

Figure 1:
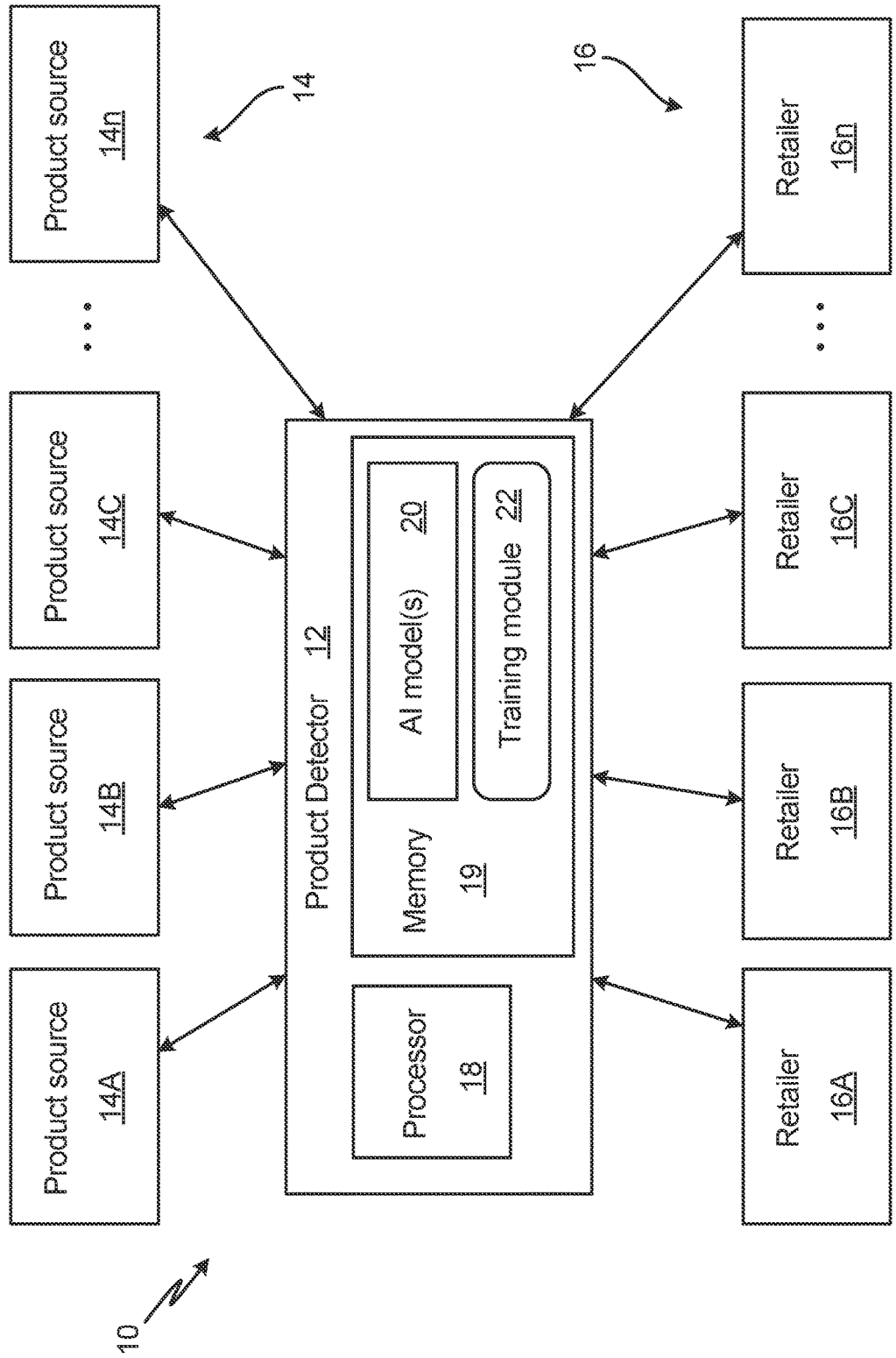
FIG. 1 is a block diagram of a product detection system with multiple product sources and multiple retailers.

FIG. 1 is a block diagram of product detection system 10 with multiple product sources and multiple retailers. Product detection system 10 includes product detector 12, product sources 14 (including product source 14A, product source 14B, product source 14C, and product source 14n), and retailers 16 (including retailer 16A, retailer 16B, retailer 16C, and retailer 16n). Product detector 12 includes processor 18, memory 19, artificial intelligence (AI) model(s) 20, and training module 22.

Product detection system 10 includes product detector 12 that is capable of detecting products in images. Product detector 12 receives information about products from product sources 14. In FIG. 1, four product sources are shown (including product source 14A, product source 14B, product source 14C, and product source 14n), but product detector 12 can receive information from any number of product sources 14 in alternate embodiments. Product sources 14 can, for example, be manufacturers, suppliers, or distributors. Product detector 12 also receives images from retailers 16. In FIG. 1, four retailers are shown (including retailer 16A, retailer 16B, retailer 16C, and retailer 16n), but product detector 12 can receive images from any number of retailers 16 in alternate embodiments. Retailers 16 can, for example, be any store that stores, distributes, or sells products.

Product detector 12, which can also be referred to as a computing device, includes processor 18 to implement functionality and/or process instructions, and memory 19 to store data and information before, during, and/or after operation. AI model(s) 20 and training module 22 are stored in memory 19 of product detector 12. Product detector 12 is configured to implement one or more AI model(s) 20 trained on information from product sources 14 to detect products in images from retailers 16. Product detector 12 can include hardware, firmware, and/or stored software. Product detector 12 can be entirely or partially mounted on one or more circuit boards. Product detector 12 uses training module 22 and the information about products from product sources 14 to train AI models(s) 20 to detect the products. Product detector 12 can execute AI model(s) 20 to detect products in the images from retailers 16. Product detector 12 is a cloud-based service in full or in part. AI model(s) 20 can include a single AI model or can be broken up into numerous AI models.

Product detector 12 receives information from product sources 14 that can be used by training module 22 to train AI model(s) 20 to detect products. The information product detector 12 receives about the products from product sources 12 can include images of the products and metadata about the products, which includes at least a tag to identify the product in the images. For example, each product source 14 can send an annotation package for each product they produce to product detector 12 that includes images of the products and metadata about the product, including a tag to identify the product.

Product detector 12 receives information about products from multiple product sources 14 to create AI model(s) 20 that are capable of detecting products from multiple product sources. Retailers 16 can then use product detector 12 to detect products across multiple categories of products and/or from multiple product sources.

Product detector 12 can receive information about numerous products across numerous product categories from product sources 14. Product detector 12 can categorize the products it is trained to detect into different product categories. The product categories can include, for example, food products, pharmaceutical products, beauty products, clothing products, home products, etc. The categories can also be subcategorized. For example, a food product category can be subcategorized into dairy products, produce products, meat products, canned goods products, bread products, candy products, etc. If a retailer is a specialty store, it can subscribe only to those categories that are relevant to its product offerings. For example, a pharmacy can subscribe only to the categories for pharmaceutical products, beauty products, and candy products if those are the only products it is offering.

Retailers 16 can send images to product detector 12 for product detector 12 to detect what products are in the image. Product detector 12 is capable of detecting products that it has been trained to recognize. Product detector 12 detects products by executing AI model(s) 20 to analyze the images from retailers 16. After AI model(s) 20 have been executed, product detector 12 can send inferences to retailers 16, which includes at least an identification of the products product detector 12 detected in the images. Retailers 16 will receive inferences for the images they have sent to product detector 12.

Each retailer 16 can send multiple images to product detector 12. The multiple images can include, in the aggregate, image data of each product in the store. Product detector 12 can analyze all of the images to detect all of the products in the store. If product detector 12 identifies a product (or category) that retailer 16 is not subscribed to, product detector 12 can notify retailer 16 that a product was detected in one of the images that retailer 16 is not subscribed to. Further, if there are products in the images that product detector 12 has not been trained to detect, product detector 12 can send a message to retailer 16 to let them know they have products in their store that product detector 12 cannot detect.

Product detector 12 can also send information back to product sources 14. Each product source 14 can receive information from product detector 12 for the products that the respective one of product sources 14 produces. For example, if product source 14A manufactures product A, product detector 12 can send information to product source 14A about which retailers 16 are selling product A and/or how many products A are being sold (in the aggregate and/or at each respective one of retailers 16).

Product detection system 10 can include memory 19 that is configured to store data and information before, during, and/or after operation. Memory 19, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 19 is a temporary memory, meaning that a primary purpose of the memory is not long-term storage. Memory 19, in some examples, is described as volatile memory, meaning that the memory does not maintain stored contents when power to product detector 12 is turned off. Examples of volatile memories can include random access memories (RAM), dynamic random access memories (DRAM), static random access memories (SRAM), and other forms of volatile memories. In some examples, memory 19 is used to store program instructions for execution by processor 18. Memory 19, in one example, is used by software or applications running on product detection system 10 (e.g, by one or more computer-implemented machine learning models) to temporarily store information during program execution.

Memory 19, in some examples, also includes one or more computer-readable storage media. Memory 19 can be configured to store larger amounts of information than volatile memory. Memory 19 can further be configured for long-term storage of information. In some examples, memory 19 includes non-volatile storage elements. Examples of such non-volatile storage elements can include magnetic hard discs, optical discs, flash memories, or forms of electrically programmable memories (EPROM) or electrically erasable and programmable (EEPROM) memories.

Product detection system 10 also includes processor 18 to implement functionality and/or process instructions. For example, processor 18 can be capable of processing instructions stored in memory 19. Examples of processor 18 can include one or more of a microprocessor, a controller, a digital signal processor (DSP), an application specific integrated circuit (ASIC), a field-programmable gate array (FPGA), or other equivalent discrete or integrated logic circuitry.

Software and/or other program instructions stored and executed by product detector 12 can be modified or otherwise updated. For instance, updates or other changes to stored software code of product detector 12 (e.g., AI model(s) 20 or other software code) can be implemented as new updates become available, such as when changes to AI model(s) 20 are available. In other examples, such updates or other changes can be implemented at product detector 12 at a defined frequency, such as every month, every week, or other frequencies. In general, changes to software and/or other program instructions of product detector 12 can be made at any time (or time interval) to facilitate the adaptation of, e.g., AI model(s) 20 for greater accuracy of product detection, the addition of new products or product categories, changes to product packaging, or other changes or enhancements of the functionality attributed herein to product detector 12. For instance, as product sources 14 introduce new products, product sources 14 can take images, enter metadata about the images, and send the information for the new products to product detector 12. If the product packaging for a product changes, product sources 14 can take new images, update the associated metadata for that product as needed, and send the new information for that product to product detector 12. Training module 22 can train AI model(s) 20 of product detector 12 to detect the new products and the new packaging based on the information it receives from product sources 14. Product detector 12 allows AI model(s) 20 to be updated as new products are introduced and as product packing changes. As product packaging changes, AI model(s) 20 of product detector 12 can, in some examples, detect both the old product packaging and the new product packaging.

If a retailer has a thousand products in their store, it is likely that a few new products are added each week and that a few products have new product packaging each week. If a retailer is maintaining their own AI model, they are required to frequently identify new products and products with new packaging, gather the information that is needed to retrain their AI model, and then retrain and deploy the updated AI model to maintain acceptable levels of system accuracy. Utilizing product detector 12 that is frequently and promptly updated by product sources 14 allows retailers 16 to accurately detect the products in their stores without having to maintain their own AI model for product detection, thereby saving retailers 16 significant time and resources. Product sources 14 sending information to product detector 12 to train AI model(s) 20 as they produce new products or products with new packaging allows product detector 12 to be automatically trained to detect the new products or products with new packaging before those products are even shipped to retailers 16.

Multiple product sources 14 submit information about their products to product detector 12 to train AI model(s) 20, which allows product detector 12 to detect a large variety of products. Product sources 14 can produce varying numbers of products across numerous categories. For example, product source 14A can produce 100 food products, product source 14B can manufacture 200 pharmaceutical products, product source 14C can produce 20 home products, etc. Product detector 12 is able to detect a large and varying number of products based on the products product sources 14 submit to product detector 12. Having a single product detector 12 that can identify such a large and varying number of products allows retailers 16 to subscribe to a single product detector 12 to detect all of the products in their stores.

Product detector 12 also allows retailers 16 that have not created their own AI model for product detection to subscribe to product detector 12 to detect products in their stores. This allows more retailers 16 to detect products in their stores, which can be helpful for product sources 14 to understand where, how, and at what rate their products are being sold. This information can help product sources 14 make decisions about manufacturing quantity and distribution. For example, if one product source 14 learns that most of their products are being sold in a certain geographical region, it can set up distribution in that region and/or increase product inventory in that region. Further, product sources 14 can monitor whether their products are being sold in areas in which they are not approved for sale or in ways they are not approved to be sold, helping them to prevent potential logistical, contractual, or other product-related issues.

Figure 2:
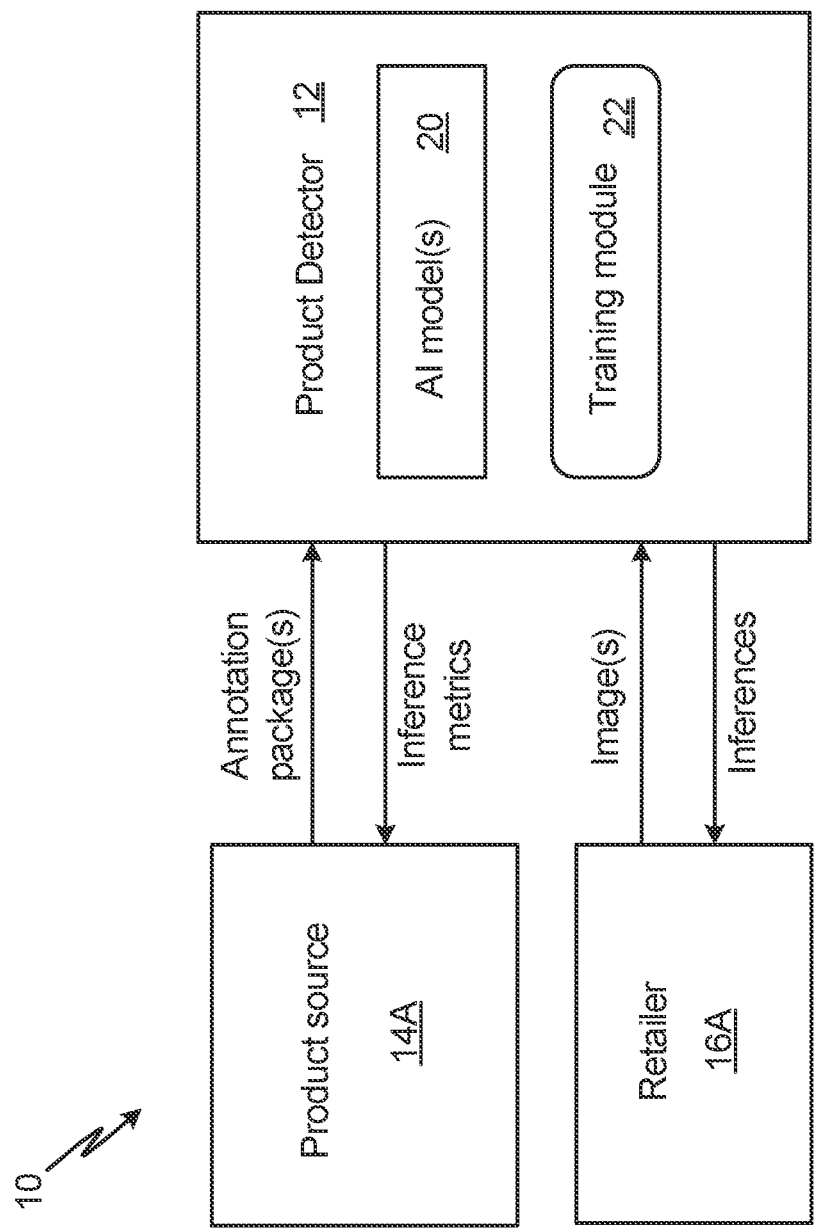
FIG. 2 is a block diagram of the product detection system.

FIG. 2 is a block diagram of product detection system 10. Product detection system 10 includes product detector 12, product source 14A, and retailer 16A. Product detector 12 includes AI model(s) 20 and training module 22.

Product detection system 10 has the same components and design as discussed above in reference to FIG. 1. However, a single product source 14A and a single retailer 16A are shown in FIG. 2 for purposes of clarity and ease of discussion. Further, processor 18 and memory 19 of product detector 12 are not shown in FIG. 2 for similar purposes of clarity and ease of discussion, though it should be understood that the techniques of product detection system 10 described above in reference to FIG. 1 to include multiple product sources 14 and multiple retailers 16 are also applicable to the example of FIG. 2.

As shown in FIG. 2, product source 14A sends one or more annotation packages to product detector 12. Each annotation package correlates to a single product from product source 14A. Each annotation package includes one or more images of a product and associated metadata, which includes at least a tag to identify the product. The one or more images should include sufficient image data of the product from various angles and orientations (e.g., all sides) so that the product can be accurately detected regardless of how it is positioned in a store. Product detector 12 uses the annotation packages to train AI model(s) 20 to detect the product associated with each annotation package. If product source 14A produces a single product, it can send a single annotation package to product detector 12. If product source 14A produces numerous products, it can send an annotation package for each product to product detector 12. If the product packaging for a product changes, product source 14A can send a new annotation package to product detector 12 that includes image data corresponding to the new product packaging.

Product detector 12 uses the annotation package(s) to train AI model(s) 20 to detect the product(s). Training module 22 of product detector 12 receives the annotation package(s) from product source 14A. For each annotation package, training module 22 trains AI model(s) 20 to detect the product associated with that annotation package. Training module 22 uses the one or more images from each annotation package to train AI model(s) 20 to recognize that product. Training module 22 uses the metadata associated with the one or more images in the annotation package to give AI model(s) 20 information about the product. For example, the metadata in the annotation package includes a tag with the product name to at least train AI model(s) 20 to correlate the name of the product shown in the one or more images with the image data of the product included in the one or more images. Additionally, the metadata in the annotation package can optionally be used to train AI model(s) 20 to identify the following: the size of the package, the variation of the product, how the product should be sold (i.e., sell as a group), where the product was manufactured, etc.

If the product packaging for a product changes, product source 14A can send an annotation package with images of the new product packaging and associated metadata to product detector 12. Training module 22 can then train AI model(s) 20 to detect the new product packaging and associate both the old product packaging and the new product packaging with the same product. This allows AI model(s) 20 to accurately detect both the old product packaging and the new product packaging as the same product.

After AI model(s) 20 has been trained by training module 22, product detector 12 can deploy the new version of AI model(s) 20. Product detector 12 can retain multiple versions of AI model(s) 20 as AI model(s) 20 are retrained to detect new product or new product packaging. Product detector 12 can execute different versions of AI model(s) 20 to detect products in images from retailer 16A and determine which version of AI model(s) 20 is more accurate. It is assumed that the most accurate version of AI model(s) 20 will be the most recent version of AI model(s) 20 that has been trained to detect the largest number of products. Product detector 12 can then remove less accurate versions of AI model(s) 20.

Retailer 16A sends one or more images to product detector 12, which then executes AI model(s) 20 to analyze the one or more images. AI model(s) 20 will analyze each image to detect which products, if any, are present in the image. After analyzing an image, product detector 12 provides inferences to retailer 16A. The inferences include at least an identification of one or more products in the image. Further, the inferences can optionally include any of the following: a number of each product detected in the image, an indication of where each product is shown in the image, etc. Alternatively, if product detector 12 does not detect any products in the image, it can send a notice to retailer 16A that no products were identified in the image. Further, product detector 12 can only detect products that it has been trained to detect. If product detector 12 detects the shape of a product in the image that it has not been trained to detect and the shape does not overlap other detected products, a notice can be sent to retailer 16A that there is a product in the image that product detector 12 has not been trained to detect.

Product detector 12 can categorize the products it is trained to detect into different product categories. Product detector 12 can categorize the products itself, or manufacture 14A can indicate how the product should be categorized in the metadata sent in the annotation package. Product detector 12 can have a separate AI model 20 for each product category, can have numerous AI model(s) 20 that each include numerous product categories, or can include one AI model 20 for all product categories.

Retailer 16A can subscribe to one product category, to multiple product categories, or to all product categories. If retailer 16A is subscribed to less than all product categories, product detector 12 may identify a product in an image from retailer 16A that is in a category to which retailer 16A is not subscribed. Product detector 12 can then notify retailer 16A that it has detected a product in the image that it can detect, but that the product is in a category to which retailer 16A is not subscribed. Retailer 16A can then determine whether it wants to subscribe to additional product categories based on the products being detected by product detector 12.

Further, product detector 12 can send inference metrics to product source 14A after it has analyzed an image from retailer 16A. The inference metrics can include any of the following: an identification of what products were present in the image, where the products were sold, how many products were sold, etc. To get the inference metrics, product source 14A can send a request to product detector 12 to get the inference metrics, or product detector 12 can automatically send the inference metrics to product source 14A. In one example, product source 14A can have a portal with product detector 12 that it can access to get the inference metrics.

Figure 3:
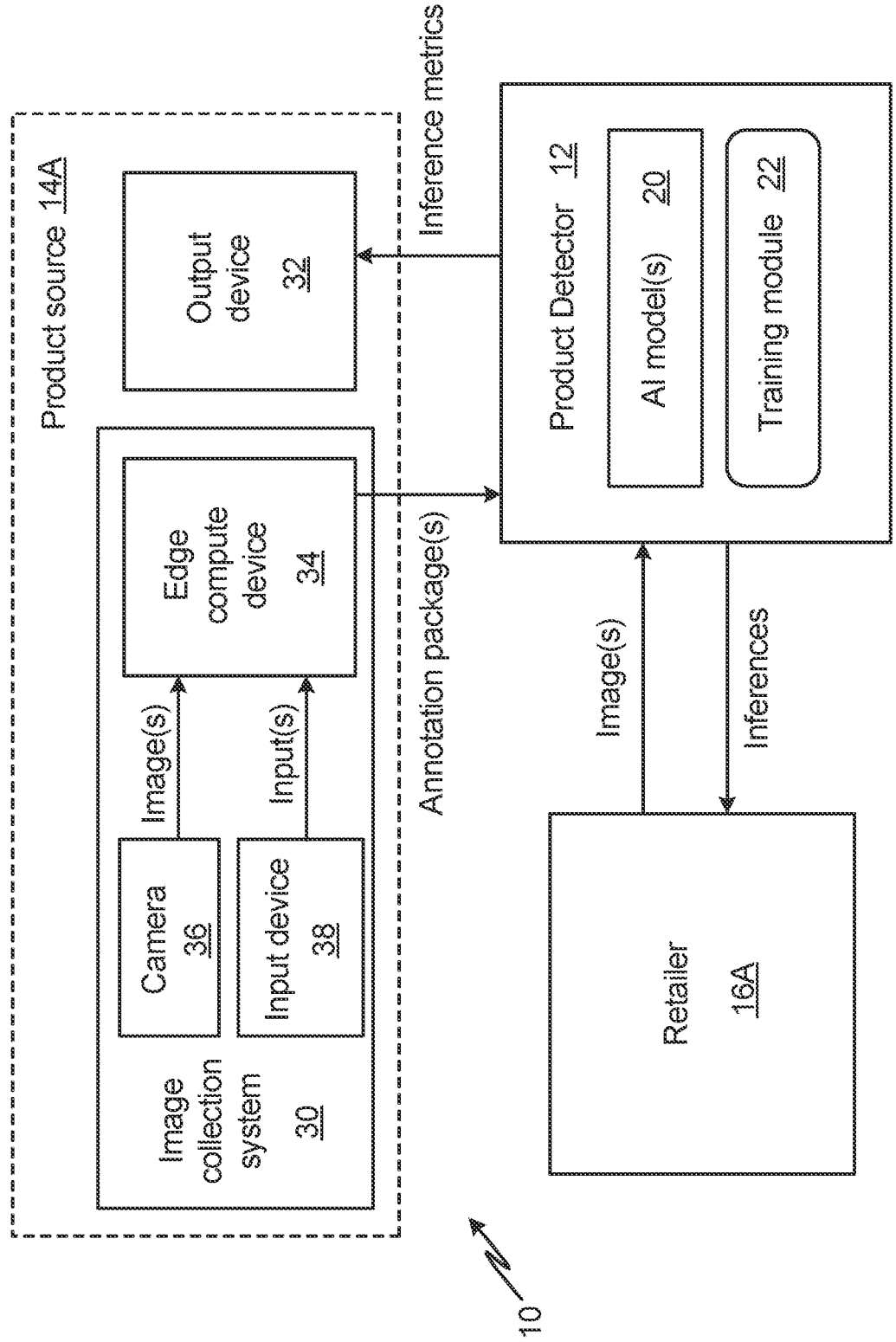
FIG. 3 is a block diagram of the product detection system with an image collection system and an output device on premises at a product source.

FIG. 3 is a block diagram of product detection system 10 with image collection system 30 and output device 32 on premises at product source 14A. Product detection system 10 includes product detector 12, product source 14A, and retailer 16A. Product detector 12 includes AI model(s) 20 and training module 22. FIG. 3 also shows image collection system 30 and output device 32. Image collection system 30 includes edge compute device 34, camera 36, and input device 38.

Product detection system 10 has the same components and design as discussed above in reference to FIGS. 1-2. However, a single product source 14A and a single retailer 16A are shown in FIG. 3 for purposes of clarity and ease of discussion. Further, processor 18 and memory 19 of product detector 12 are not shown in FIG. 3 for similar purposes of clarity and ease of discussion, though it should be understood that the techniques of product detection system 10 described above in reference to FIG. 1 to include multiple product sources 14 and multiple retailers 16 are also applicable to the example of FIG. 3.

As shown in FIG. 3, image collection system 30 and output device 32 are located on premises at product source 14A. Image collection system 30 takes images of a product, allows a user to input metadata about the product, and creates an annotation package to send to product detector 12 to train product detector 12 to detect the product. Output device 32 receives information from product detector 12.

Image collection system 30 includes edge compute device 34 that is used to create annotation packages to send to product detector 12. Edge compute device 34 can be a gateway node, edge device, container, virtual machine, or other software and/or hardware. In some examples, such as the illustrated example of FIG. 3, edge compute device 34 can be implemented as a single computing device. In other examples, functionality attributed herein to edge compute device 34 can be distributed among multiple computing devices that, in the aggregate, implement the functionality attributed herein to edge computing device 34. Edge compute device 34 can include one or multiple storage media for storing information, such as image(s) from camera 36, input(s) from input device 38, and/or annotation package(s). Edge compute device 34 can be located at various locations, including adjacent to camera 36 and/or input device 38, on the same network as camera 36 and/or input device 38, distant from camera 36 and/or input device 38 with image(s) from camera 36 and input(s) from input device 38 being received by edge compute device 34 from camera 36 and input device 38 via a wired or wireless connection, or at multiple locations. Edge compute device 34 is in communication with product detector 12 to send annotation package(s) to product detector 12.

Camera 36 is communicatively coupled to edge compute device 34. Camera 36 takes images of the product. In alternate embodiments, image collection system 30 can include more than one camera 34 to take images of the product from different sides. Camera 36 can be any device capable of taking images, such as any internet-connected camera, USB camera, or other camera that allows access to the video feed through programmatic access. Camera 36 sends the image(s) to edge compute device 34. Camera 36 can take and send the image(s) in any resolution and any format. Camera 36 can send the image(s) to edge compute device 34 over any suitable means, including the internet, short-range wireless technology, or any other type of wire and/or wireless connection.

Input device 38 is also communicatively coupled to edge compute device 34. Input device 38 is used by a user to input metadata about the product into image collection system 30. Input device 38, in some examples, is configured to receive input from a user. Examples of input device 38 can include a mouse, a keyboard, a microphone, a camera device, a presence-sensitive and/or touch-sensitive display, or other type of device configured to receive input from a user. In some embodiments, input device 38 can be integrally formed with edge compute device 34.

Edge compute device 34 receives one or more image(s) from camera 36 and one or more input(s) from input device 38. A user can manually take images of the product using camera 36 or one or more cameras 36 can be set up on an assembly line or in a predetermined location at product source 14A to automatically take images of the product. Edge compute device 34 takes the image(s) from camera 36 and the input(s) from input device 38 to create an annotation package for each product that can be sent to product detector 12 to train AI model(s) 20 to detect the product, as discussed in more detail with respect to FIGS. 1-2.

Once product detector 12 has detected products in an image from retailer 16A, inference metrics can be sent to output device 32. Output device 32, in some examples, is configured to output the inference metrics from product detector 12. Examples of output device 32 can include a network communication interface, a display device, a sound card, a video graphics card, a speaker, a cathode ray tube (CRT) monitor, a liquid crystal display (LCD), or other type of device for outputting information in a form understandable to users or machines. In alternate embodiments, output device 32 can be integrally formed with edge compute device 34. The inference metrics can include information that may be helpful for product source 14A, for example an identification of what products were present in the image, where the products were sold, and/or how many products were sold.

In some embodiments, edge compute device 34 can also send images from camera 36 to product detector 12 to ensure that product detector 12 is accurately detecting its products. Camera 36 can take an image of a product that product detector 12 has previously been trained to detect. The image can be sent to product detector 12 via edge compute device 34. Product detector 12 can execute AI model(s) 20 to detect a product in the image. Product detector 12 can then send the identification of the detected product to output device 32. A user at product source 14A can then determine whether product detector 12 accurately detected the product that was in the image sent to product detector 12 from camera 36. Further, if minor changes are made to the packaging of a product, product detector 12 may be able to identify the product based on the old product packaging. In this instance, product detector 12 can then send the associated metadata to edge compute device 34 for a user to update as needed based on the new product packaging.

Further, if camera 36 is positioned to take images of the product on the assembly line, edge compute device 34 can interface with an existing programmable logic controller (PLC) at product source 14A. The PLC can inform edge compute device 34 what product is on the assembly line. The PLC can also interface with edge compute device 34 to confirm verbiage on the package.

Figure 4:
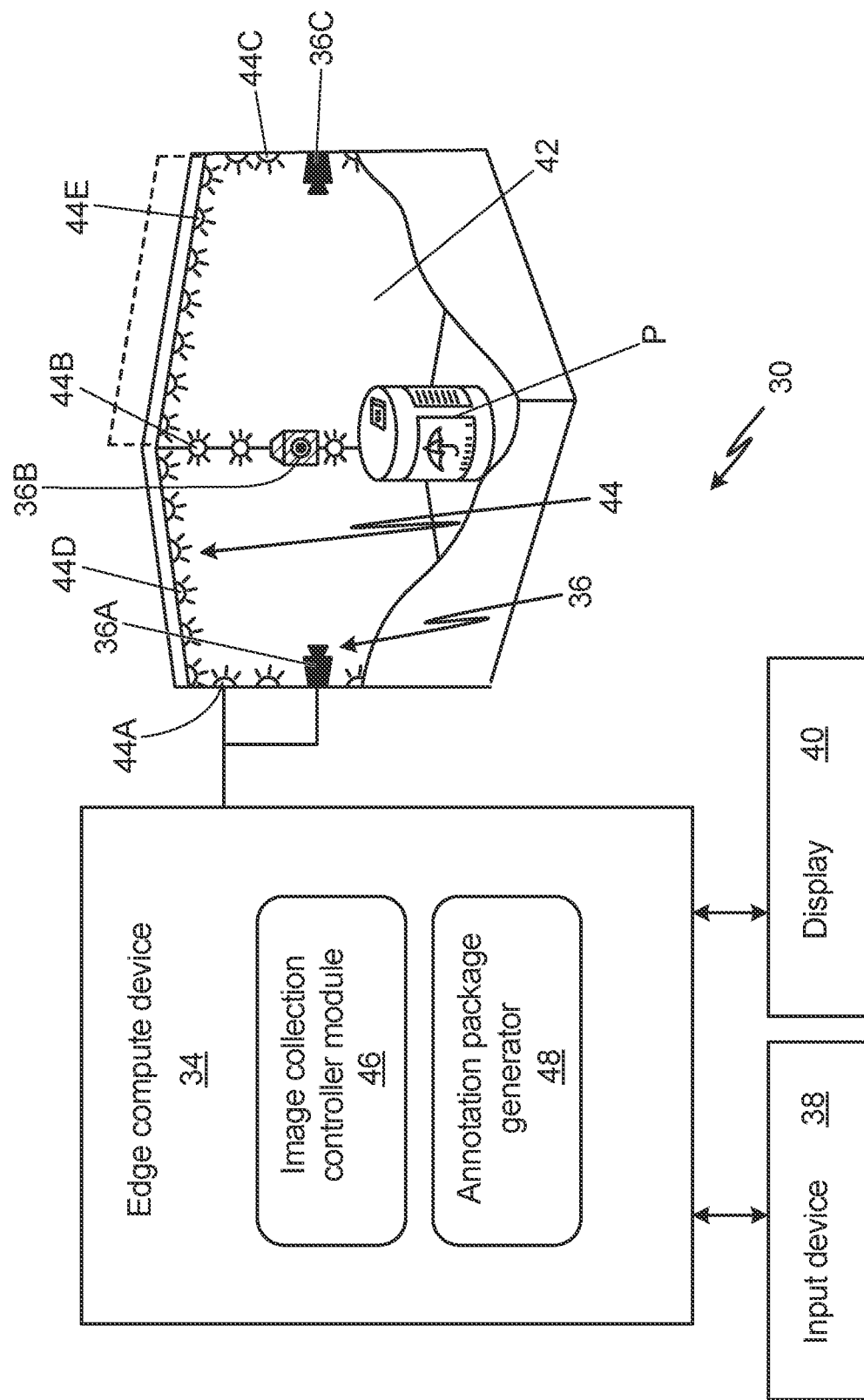
FIG. 4 is a schematic diagram of the image collection system.

FIG. 4 is a schematic diagram of image collection system 30, which includes edge compute device 34, cameras 36 (including camera 36A, camera 36B, and camera 36C), input device 38, display 40, enclosure 42, and LED rows 44 (including LED row 44A, LED row 44B, LED row 44C, LED row 44D, and LED row 44E). Edge compute device 38 includes image collection controller module 46 and annotation package generator 48. FIG. 4 also shows product P.

Image collection system 30 is shown in more detail in FIG. 4. As shown in FIG. 3, image collection system 30 is located on premises at product source 14A. Image collection system 30 takes images of product P, receives input metadata about product P, and generates an annotation package for product P to be sent to product detector 12 (shown in FIGS. 1-3). Image collection system 30 includes edge compute device 34 to generate the annotation packages, cameras 36 communicatively coupled to edge compute device 34 to take images of product P, input device 38 communicatively coupled to edge compute device 34 to input metadata about product P into edge compute device 34, and display 40 communicatively coupled to edge compute device 34 to display images, inputs, and annotation packages from edge compute device 34.

Image collection system 30 includes edge compute device 34 that is used to generate annotation packages to send to product detector 12. Edge compute device 34 was discussed in more detail with respect to FIG. 3. Input device 38 is used by a user to input metadata about the product into image collection system 30. Input device 38 was discussed in more detail with respect to FIG. 3.

Display 40 displays images, inputs, and annotation packages from edge compute device 34. For example, as cameras 36 take images of product P, those images can be displayed on display 40 for a user to review. Display 40 can be, for example, a liquid crystal display (LCD), a light-emitting diode (LED) display, an organic light emitting diode (OLED) display, a plasma display, or any other type of electronic display device capable of presenting graphical content to a user. In some examples, display 40 can be separate from and electrically and/or communicatively coupled with edge compute device 34. In other examples, display 40 can be integrally formed with edge compute device 34.

Image collection system 30 further includes enclosure 42 and LED rows 44. Enclosure 42 is shown with partially cut away walls in FIG. 4, but is a fully enclosed box. Enclosure 42 can include a door that can be opened and closed to allow for the placement of and removal of product P in enclosure 42. In one embodiment, enclosure 42 can have walls with a neutral color, such as white or cream, to provide a neutral background for images of product P. In a second embodiment, enclosure 42 has interchangeable inserts in the walls to vary the color of the walls of enclosure 42. If product P is light in color, it may be advantageous to use darker colored walls to highlight product P. Enclosure 42 can vary in size based on the size of products being placed in enclosure 42. Cameras 36 and LED rows 44 are positioned in enclosure 42 and are communicatively coupled to edge compute device 34.

Camera 36A is positioned in a first corner of enclosure 42, camera 36B is positioned in a second corner of enclosure 42, and camera 36C is positioned in a third corner of enclosure 42. A fourth camera not shown in FIG. 4 will be placed in a fourth corner of enclosure 42. As shown in FIG. 4, cameras 36 can be positioned in the corners of enclosure 42 between a bottom and a top of enclosure 42. Cameras 36 can be positioned in any suitable locations in enclosure 42 in alternate embodiments. Camera 36A will obtain a first image with a first field of view of product P, camera 36B will obtain a second image with a second field of view of product P, camera 36C will obtain a third image with a third field of view of product P, and the fourth camera (not shown in FIG. 4) will obtain a fourth image with a fourth field of view of product P. The first field of view, the second field of view, the third field of view, and the fourth field of view are different. Specifically, each field of view can be a different side of product P.

First LED row 44A is positioned in a first corner of enclosure 42 extending from the bottom to the top, second LED row 44B is positioned in a second corner of enclosure 42 extending from the bottom to the top, and third LED row 44C is positioned in a third corner of enclosure 42 extending from the bottom to the top. A fourth LED row not shown in FIG. 4 will be placed in a fourth corner of enclosure 42 extending from the bottom to the top. Fifth LED row 44D is positioned along a top edge of enclosure 42 extending between the first corner and the second corner, and sixth LED row 44E is positioned along a top edge of enclosure 42 extending between the second corner and the third corner. A seventh LED row not shown in FIG. 4 is positioned along a top edge of enclosure 42 extending between the third corner and the fourth corner, and an eight LED row not shown in FIG. 4 is positioned along a top edge of enclosure 42 extending between the fourth corner and the first corner. LED rows 44 can be positioned in any suitable locations in enclosure 42 in alternate embodiments.

Product P can be placed in enclosure 42 to obtain images of product P. Once product P is placed in enclosure 42, a process can be initiated in enclosure 42 that automatically lights LED rows 44 and captures images with cameras 36. LED rows 44 can be lit to illuminate enclosure 42. Cameras 36 can then take images of product P. Specifically, LED rows 44 can be selectively illuminated based on what camera 36 is taking an image at a given time and to change the exposure of enclosure 42. Further, cameras 36 can take images in a predetermined order to capture images of all sides of product P.

LED row 44 positioned in the same corner as camera 36 will be illuminated as that camera 36 takes an image. Specifically, first LED row 44A will be illuminated as first camera 36A takes an image, second LED row 44B will be illuminated as second camera 36B take an image, third LED row 44C will be illuminated as third camera 36C takes an image, and the fourth LED row (not shown in FIG. 4) will be illuminated as the fourth camera (not shown in FIG. 4) takes an image. Additionally, if extra lighting is needed to illuminate product P, other LED rows 44 can be illuminated to illuminate product P. For example, if camera 36A is taking an image of product P, fifth LED row 44D, the eighth LED row (not shown in FIG. 4), second LED row 44B, or the fourth LED row (not shown in FIG. 4) can be illuminated to better illuminate the sides of product P.

LED rows 44 can also include LEDs that can vary in their illumination. Depending on the color of the walls of enclosure 42 and the color of product P, the LEDs of LED rows 44 can be brightened or dimmed to vary the illumination in enclosure 42. For example, if the walls of enclosure 42 are white and/or product P has glossy packaging, the LEDs of LED rows 44 can be dimmed to reduce glare off of the white walls and/or the glossy packaging.

Cameras 36 can take images of product P in successive order to captures images of all sides of product P. For example, first camera 36A can take an image first, second camera 36B can take an image second, third camera 36C can take an image third, and the fourth camera (not shown in FIG. 4) can take an image fourth. The images can then be communicated to edge compute device 34.

Edge compute device 34 includes image collection controller module 46 and annotation package generator 48. Image collection controller module 46 controls cameras 36 and LED rows 44 in enclosure 42, specifically the order in which cameras 36 take images and what LED rows 44 to illuminate based on what camera 36 is taking an image. Image collection controller module 46 can include set instructions for collecting images of product P in enclosure 42 that include instructions about what LED rows 44 to illuminate based on what camera 36 is taking an image and the order in which cameras 36 should collect images. Image controller module 46 sends the instructions to cameras 36 and LED rows 44 to collect images of product P. The images taken by cameras 36 can then be communicated to edge compute device 34.

Edge compute device 34 can display the images on display 40. A user can then review the images to ensure that product P can be clearly seen in the images. If the user determines that product P cannot be clearly seen, the user can send instructions to enclosure 42 to adjust the illumination of LED rows 44. This can include adjusting what LED rows 44 are illuminated as images are being taken by respective cameras 36, the brightness of the LEDs of LED rows 44, RGB values of any one or more of LED rows 44, or any other needed adjustments using image collection controller module 46. Image collection controller module 46 can then send the revised instructions to cameras 36 and LED rows 44. Cameras 36 can then retake the images of product P and send them to edge compute device 34. A user can then rereview the images. If product P can be clearly seen, the user can approve the images in image collection controller module 46 for use in annotation package generator 48. If product P cannot be clearly seen, the user can make further adjustments as needed and retake the images until product P can be clearly seen.

If a user makes adjustments to the lighting so that product P can be clearly seen, the user can save the settings that worked as a template for use with product P in the future. Edge compute device 34 can store the lighting settings and any metadata associated with product P to use with product P in the future. If the packaging for product P is changed, a user can select the template for product P to gather the images from cameras 36 and edge compute device 34 can automatically recall the metadata for product P. A user can then modify the metadata as needed.

Image collection controller module 46 can also have preset lighting schemes that a user could select based on product P. For example, image collection controller module 46 could have preset lighting schemes for glossy products and for matte products. A user can select a preset lighting scheme based on the qualities of product P.

Annotation package generator 48 takes the images from cameras 36 to create annotation packages to send to product detector 12. A user can also input metadata about product P into annotation package generator 48 using input device 38. As discussed above in reference to FIGS. 1-2, the metadata about product P can include, for example, the size of the package, the variation of the product, how the product should be sold (i.e., sell as a group), and/or where the product was manufactured. Annotation package generator 48 will then create an annotation package that includes images of product P and the metadata about product P. Edge compute device 34 will then send the annotation package to product detector 12.

In some embodiments, edge compute device 34 can execute optical character recognition (OCR) routines on product P. The results of OCR can be reviewed by edge compute device 34 to ensure that product P is properly labeled. For example, rules could be set (e.g., via metadata associated with product P) in edge compute device 34 that for a given product P there should be certain ingredients listed on product P. If edge compute device 34 executes an OCR routine on product P and those ingredients are not listed, compute device 34 can produce an alert, such as a visual or audio alert to a user. Further, OCR can be used to ensure that a user has input the current information about product P into edge compute device 34. For example, if a user tags product P as Product XYZ, OCR can be used to ensure that product P is in fact Product XYZ. If OCR indicates that product P is something other than Product XYZ, an alert can be produced (e.g., sent to the user) via edge compute device 34 to notify them that they have improperly tagged product P.

Enclosure 42 can be installed at product sources to automate the process by which product sources take images and input metadata about their products to create annotation packages to send to product detector 12. If a product source has a new product it produces or a product with a new package, it can place that product in enclosure 42, execute image collection controller module 46 in edge compute device 34 to obtain images of the product, input metadata about the product using input device 38, and execute annotation package generator 48 to create annotation packages with the images and the input metadata.

Using enclosure 42 to collect images of product P also reduces variations in how images are collected. This helps to reduce user error that may exist with taking images manually, such as a user failing to take an image of all (or a sufficient number of) sides of product P. Further, enclosure 42 allows images of all of the sides of product P to be gathered in one step.

Figure 5:
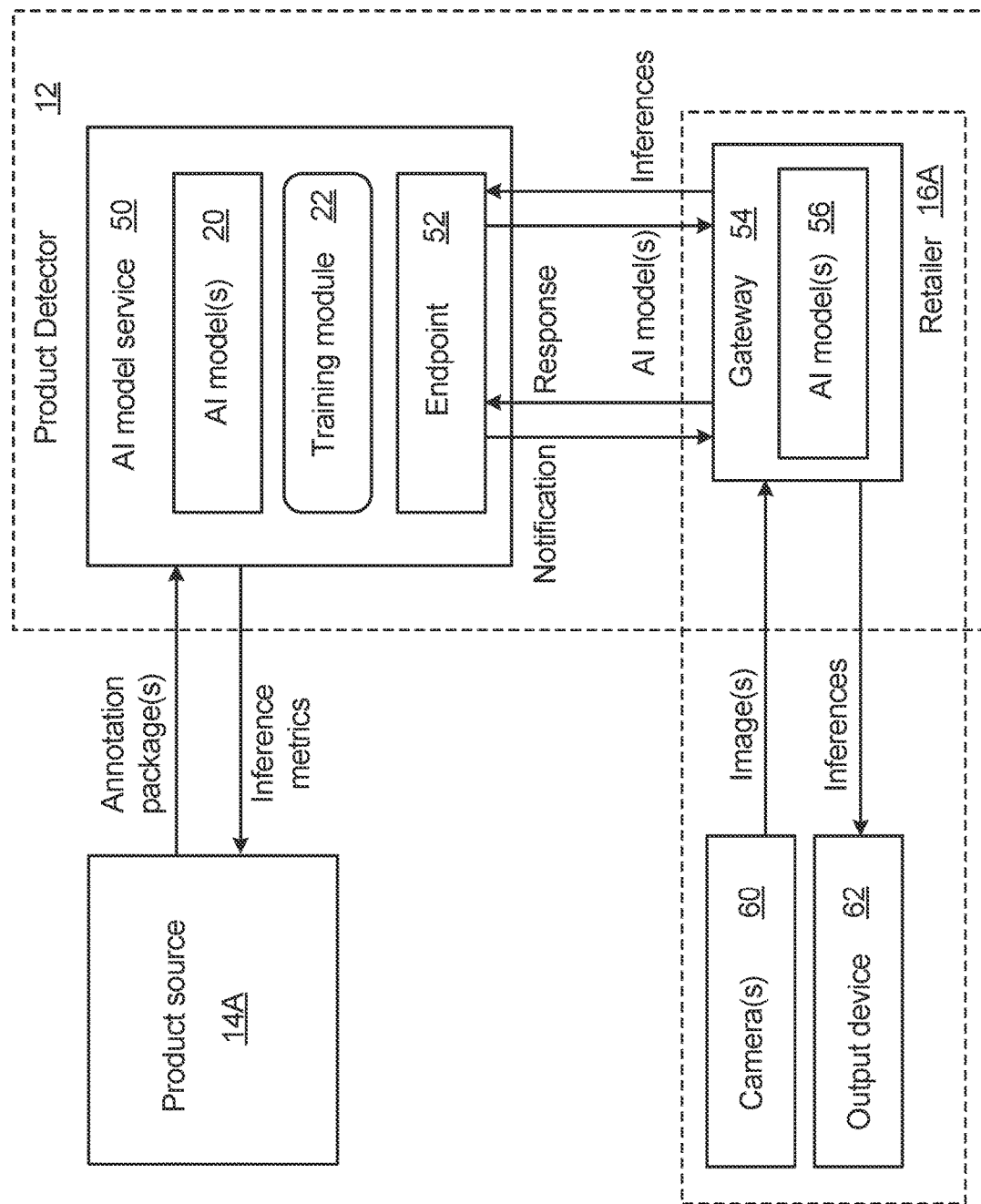
FIG. 5 is a block diagram of the product detection system with a first embodiment of a gateway, a camera(s), and an output device on premises at a retailer.

FIG. 5 is a block diagram of product detection system 10 with gateway 56, camera(s) 56, and output device 58 on premises at retailer 16A. Product detection system 10 includes product detector 12, product source 14A, and retailer 16A. Product detector 12 includes AI model(s) 20, training module 22, AI model service 50, endpoint 52, gateway 54, and AI model(s) 56. FIG. 5 also shows camera(s) 60 and output device 62.

Product detection system 10 has the same components and design as discussed above in reference to FIGS. 1-2. However, a single product source 14A and a single retailer 16A are shown in FIG. 5 for purposes of clarity and ease of discussion. Further, processor 18 and memory 19 of product detector 12 are not shown in FIG. 5 for similar purposes of clarity and ease of discussion, though it should be understood that the techniques of product detection system 10 described above in reference to FIG. 1 to include multiple product sources 14 and multiple retailers 16 are also applicable to the example of FIG. 5.

Product detector 12 includes AI model service 50 that includes AI model(s) 20, training module 22, and endpoint 52 that are located in the cloud. Product detector 12 further includes gateway 54 and AI model(s) 56 that are located on premises at retailer 16A. Camera(s) 60 and output device 62 are also located on premises at retailer 16A.

AI model service 50 is a cloud-based service that hosts AI model(s) 20, training module 22, and endpoint 52. Product source 14A sends annotation package(s) to AI model service 50. AI model(s) 20 and training module 22 have the same function and design as discussed above in reference to FIGS. 1-2. Training module 22 will receive the annotation package(s) from product source 14A and use the annotation package(s) to train AI model(s) 20 to detect products. AI model service 50 also includes an endpoint 52 that retailer 16A can subscribe to for accessing AI model(s) 20. Endpoint 52 can be any computing device, such as a server, a router, a laptop or desktop computer, of other computing device capable of communicating over a communications networks, such as via wired or wireless communications with gateway 54.

Gateway 54 is located on premises at retailer 16A and is the communication pathway between retailer 16A and AI model service 50, specifically endpoint 52. Gateway 54 can be a gateway node, edge device, container, virtual machine, or other software and/or hardware. In some examples, gateway 54 can be implemented as a single device. In other examples, functionality attributed herein to gateway 54 among multiple devices that coordinate to perform the functions attributed herein to gateway 54. Gateway 54 can include one or multiple storage media for storing information, such as AI model(s) 56, images from camera(s) 60, and/or inferences from executing AI model(s) 56. Gateway 54 can be located at various locations, including adjacent to camera(s) 60 and/or on the same network as camera(s) 60, distant from camera(s) 60 with images from camera(s) 60 being received by gateway 54 from camera(s) 60 via a wired or wireless connection, or at multiple locations. Gateway 54 is in communication with AI model service 50 to receive a notification and/or AI model(s) 56 from AI model service 50 and/or to send a response and/or inferences to AI model service 50.

In the embodiment shown in FIG. 5, gateway 54 hosts AI model(s) 56 that have been downloaded from AI model service 50. AI model(s) 56 are versions of AI model(s) 20 that have been downloaded onto gateway 54. A new version of AI model(s) 20 is published after AI model(s) 20 are trained to recognize new products or new product packaging. AI model service 50 then sends a notification to gateway 54 to indicate that there is a new version of AI model(s) 20. Gateway 54 can send a response back to endpoint 52 to request the new version of AI model(s) 20, though in some examples gateway 54 may not request the new version of AI model(s) 20. AI model service 50 transmits the new version of the AI model(s) to gateway 54 in response to receiving the request for download from gateway 54. Gateway 54 stores the new version of the AI model(s) as AI model(s) 56 within computer-readable memory of gateway 54. Gateway 54 can store both the old version of AI model(s) 56 and the new version of AI model(s) 56 and can execute both for product detection. Further, gateway 54 can analyze the different version of AI model(s) 56 to determine which one detects more products, which is typically the updated version that has been trained to detect more products. Gateway 54 can then keep the best (or new) version of AI model(s) 56 and delete the other (or old) version.

AI model(s) 56 can then be executed on gateway 54 on premises at retailer 16A. Camera(s) 60 are communicatively coupled to gateway 54. Camera(s) 60 can be any device capable of capturing image data, such as any internet-connected camera, USB camera, or other camera that allows access to the video feed through programmatic access. Camera(s) 60 sends the image(s) to gateway 54. Camera(s) 60 can take and send the image(s) in any resolution and any format. Camera(s) 60 can send the image(s) to gateway 54 over any suitable means, including the Internet, short-range wireless technology, or any other type of wire and/or wireless connection. In some embodiments, camera(s) 60 can be video cameras that are capable of obtaining images. Camera(s) 60 can be positioned in the store of retailer 16A to obtain images of products on shelves, products in storage before they are shelved, and/or products in the carts of shoppers. Camera(s) 60 take images of products in the store of retailer 16A and communicates the images to gateway 54.

AI model(s) 56 can be executed on gateway 54 to analyze the images from camera(s) 60 and detect products in the images.

The inferences from the execution of AI model(s) 56, including at least the identification of products in the images, are then communicated to output device 62. Output device 62 is communicatively coupled to gateway 54. Output device 62, in some examples, is configured to output the inferences from gateway 54. Examples of output device 62 can include a network communications interface, a display device, a sound card, a video graphics card, a speaker, a cathode ray tube (CRT) monitor, a liquid crystal display (LCD), or other type of device for outputting information in a form understandable to users or machines. In some examples, output device 62 can be integrally formed with gateway 54. In alternate embodiments, output device 62 can be integrally formed with gateway 54.

Gateway 54 can also send inference metrics to endpoint 52 of AI model service 50, which can then communicate the inference metrics to product source 14A. The inference metrics can include information that may be helpful for product source 14A, for example an identification of what products were present in the image, where the products were sold, and/or how many products were present and/or sold.

The embodiment of product detection system 10 shown in FIG. 5 allows AI model(s) 56 to run on premises at retailer 16A. This allows retailer 16A to execute AI model(s) 56 as needed to analyze images taken by camera(s) 60.

Figure 6:
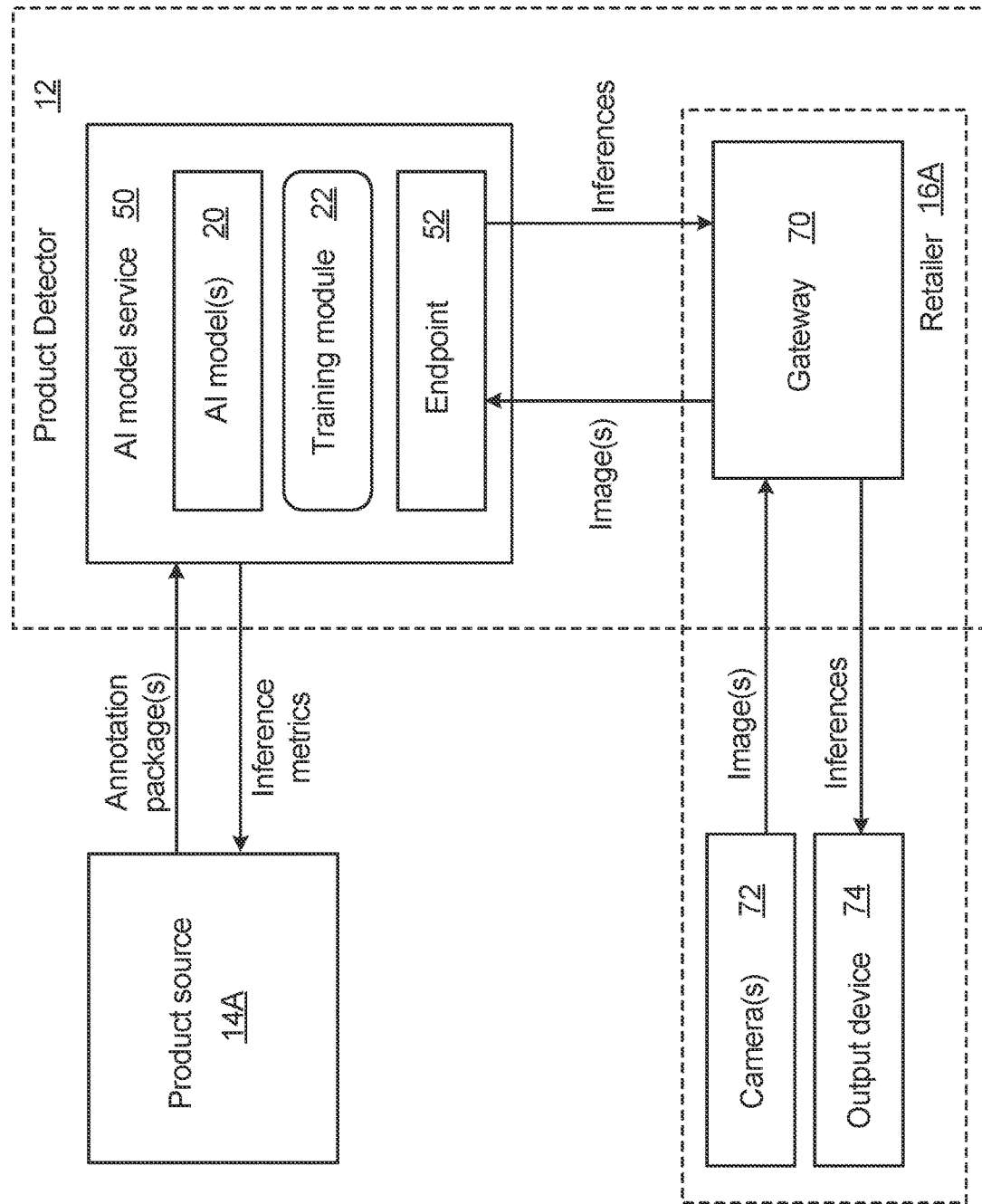
FIG. 6 is a block diagram of the product detection system with a second embodiment of a gateway, a camera(s), and an output device on premises at a retailer.

FIG. 6 is a block diagram of product detection system 10 with gateway 70, camera(s) 72, and output device 74 on premises at retailer 16A. Product detection system 10 includes product detector 12, product source 14A, and retailer 16A. Product detector 12 includes AI model(s) 20, training module 22, AI model service 50, endpoint 52, and gateway 70. FIG. 6 also shows camera(s) 72 and output device 74.

Product detection system 10 has the same components and design as discussed above in reference to FIGS. 1-2. However, a single product source 14A and a single retailer 16A are shown in FIG. 6 for purposes of clarity and ease of discussion. Further, processor 18 and memory 19 of product detector 12 are not shown in FIG. 6 for similar purposes of clarity and ease of discussion, though it should be understood that the techniques of product detection system 10 described above in reference to FIG. 1 to include multiple product sources 14 and multiple retailers 16 are also applicable to the example of FIG. 6.

Product detector 12 includes AI model service 50 that includes AI model(s) 20, training module 22, and endpoint 52 that are located in the cloud. Product detector 12 further includes gateway 70 that is located on premises at retailer 16A. Camera(s) 72 and output device 74 are also located on premises at retailer 16A.

AI model service 50 is a cloud-based service that hosts AI model(s) 20, training module 22, and endpoint 52. Product source 14A sends annotation package(s) to AI model service 50. AI model(s) 20 and training module 22 have the same function and design as discussed above in reference to FIGS. 1-2. Training module 22 receives the annotation package(s) from product source 14A and uses the annotation package(s) to train AI model(s) 20 to detect products. AI model service 50 also includes an endpoint 52 that retailer 16A can subscribe to for accessing AI model(s) 20. Endpoint 52 can be any computing device, such as a server, a router, a laptop or desktop computer, of other computing device capable of communicating over a communications networks, such as via wired or wireless communications with gateway 70.

Gateway 70 is located on premises at retailer 16A and is the communication pathway between retailer 16A and AI model service 50, specifically endpoint 52. Gateway 70 can be a gateway node, edge device, container, virtual machine, or other software and/or hardware. In some examples, gateway 70 can be implemented as a single device. In other examples, functionality attributed herein to gateway 70 can be distributed among multiple devices that coordinate to perform the functions attributed herein to gateway 70. Gateway 70 can include one or multiple storage media for storing information, such as images from camera(s) 72 and/or inferences received from AI model service 50. Gateway 70 can be located at various locations, including adjacent to camera(s) 72 and/or on the same network as camera(s) 72, distant from camera(s) 72 with images from camera(s) 72 being received by gateway 70 from camera(s) 72 via a wired or wireless connection, or at multiple locations. Gateway 70 is in communication with AI model service 50 to send images to AI model service 50 and to receive inferences from AI model service 50.

In the embodiment shown in FIG. 6, gateway 70 communicates images from retailer 16A to AI model service 50 for product detection. Camera(s) 72 are communicatively coupled to gateway 70. Camera(s) 72 can be any device capable of taking images, such as any internet-connected camera, USB camera, or other camera that allows access to the video feed through programmatic access. Camera(s) 72 sends the image(s) to gateway 70. Camera(s) 72 can take and send the image(s) in any resolution and any format. Camera(s) 72 can send the image(s) to gateway 70 over any suitable means, including the internet, short-range wireless technology, or any other type of wire and/or wireless connection. In some embodiments, camera(s) 72 can be video cameras that are capable of obtaining images. Camera(s) 72 can be positioned in the store of retailer 16A to obtain images of products on shelves, products in storage before they are shelved, and/or products in the carts of shoppers. Camera(s) 72 take images of products in the store of retailer 16A and communicates the images to gateway 70, which then communicates the images to AI model service 50 via endpoint 52. AI model(s) 20 can then be executed on AI model service 50 to analyze the images from camera(s) 72 and detect products in the images.

The inferences from the execution of AI model(s) 20, including at least the identification of products in the images, are then communicated back to gateway 70, which communicates the inferences to output device 74. Output device 74 is communicatively coupled to gateway 70. Output device 74, in some examples, is configured to output the inferences from product detector 12. Examples of output device 74 can include a display device, a sound card, a video graphics card, a speaker, a cathode ray tube (CRT) monitor, a liquid crystal display (LCD), or other type of device for outputting information in a form understandable to users or machines. In alternate embodiments, output device 74 can be integrally formed with gateway 70.

AI model service 50 can also send inference metrics to product source 14A. The inference metrics can include information that may be helpful for product source 14A, for example an identification of what products were present in the image, where the products were sold, and/or how many products were sold.

The embodiment of product detection system 10 shown in FIG. 6 executes AI model(s) 20 in the cloud. This allows retailer 16A to access AI model(s) 20 in the cloud to analyze images taken by camera(s) 72 without having to host AI model(s) 20 (or versions thereof) on premises at retailer 16A.

For both of the embodiments shown in FIGS. 5 and 6, utilizing product detector 12 allows retailer 16A to accurately identify products in its store without having to build and maintain its own AI model for product detection. Using product detector 12 allows retailer 16A to detect what products are on its shelves. Further, product detector 12 can assist in conducting inventory and/or helping retailer 16A determine which products need to be reordered. Product detector can also analyze images taken throughout the store of retailer 16A for products that are on the shelves that should not be on the shelves.

Additionally, product detector 12 can interface with additional systems to aid in stores using cashier-less technology or walkout technology. For example, cameras can be installed at cashier-less registers and can feed images of products being rung by customers into product detector 12, which can analyze the image to determine what product is being rung up by the customer. The identification of the product and associated metadata, for example price, can be sent to the cashier-less register, which can compare the product identified by product detector 12 with the product run by the customer. If product detector 12 has identified that the product being rung is Product XYZ at a price of $100.00 but the product rung by the customer is Product ABC at a price of $12.00, for example, an alert can be sent to retailer 16A. This can help prevent cases where customers have taken a barcode from a cheaper product and placed it on a more expensive product.

Figure 7:
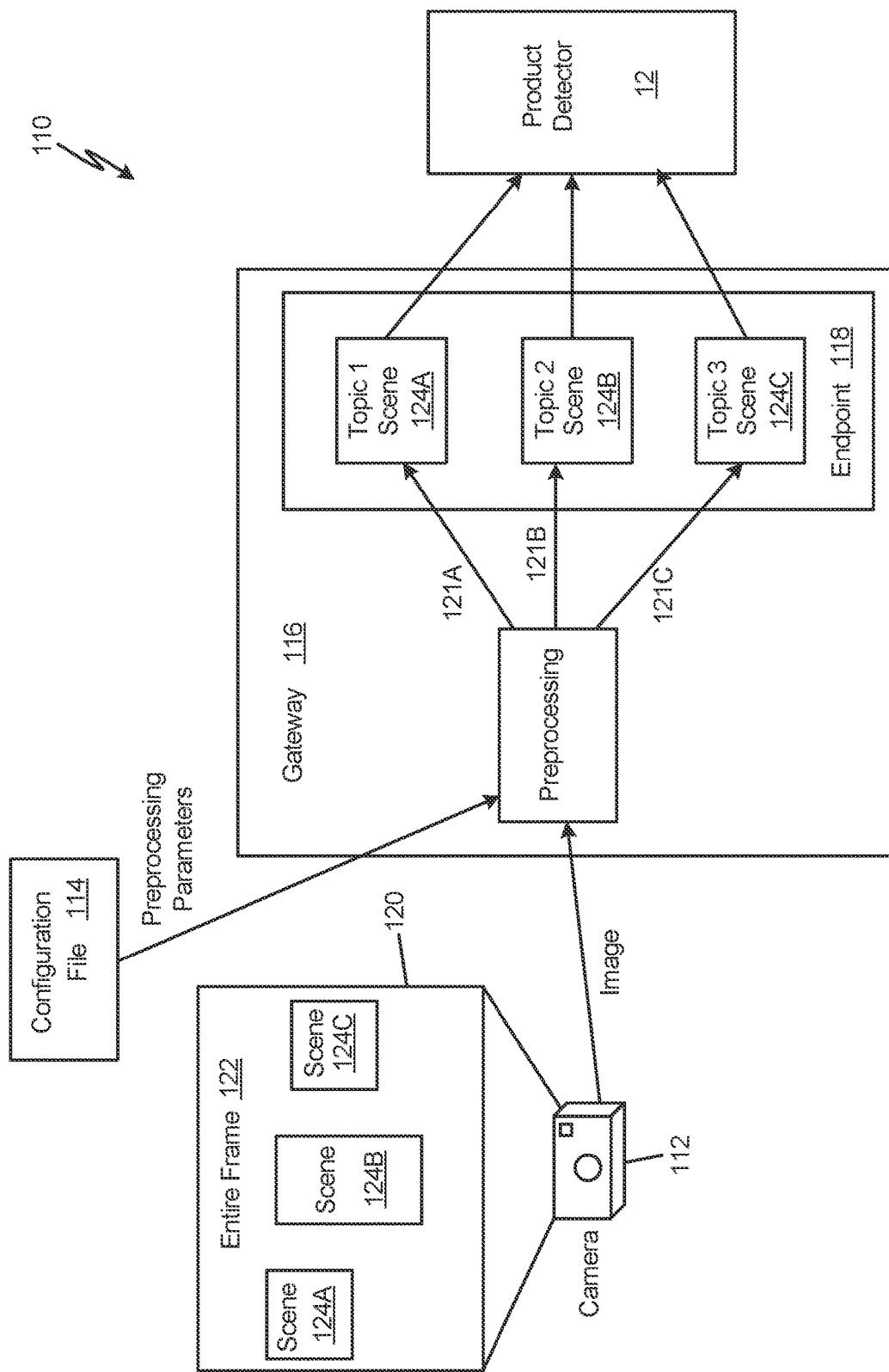
FIG. 7 is a schematic diagram of a scene selection and preprocessing system.

FIG. 7 is a schematic diagram of scene selection and preprocessing system 110 for selection/extraction, preprocessing, and publishing to subscribers of image data of a region of interest (i.e., a scene) that is a subset of a first field of view of the image. FIG. 7 shows product detector 12 (as discussed in FIGS. 1-6 above) and system 110, which includes camera 112, configuration file 114, gateway 116, and endpoint 118. Camera 112 is configured to capture a plurality of images, however a single image 120 is discussed herewith for clarity. Camera 112 captures image 120 having entire frame 122 with a first field of view. Scenes 124A, 124B, and 124C (i.e., individual regions of interest) can be selected from entire frame 122 each having a second field of view, a third field of view, and a fourth field of view, respectively, that is less than the first field of view of entire frame 122. Camera 112 collects image 120 and sends image 120 to gateway 116. Gateway 116 preprocesses image 120 according to preprocessing parameters defined in configuration file 114 and publishes (i.e., allows access/makes available) the preprocessed image as first image data 121A (for scene 124A), second image data 121B (for scene 124B), and third image data 121C (for scene 124C) to endpoint 118. Product detector 12 can be communicatively coupled to endpoint 118 to receive scenes 124A-124C from gateway 116.

Scene 124A (i.e., a first region of interest) includes first image data 121A, scene 124B (i.e., a second region of interest) includes second image data 121B, and scene 124C (i.e., a third region of interest) includes third image data 121C that are each dependent upon image 120. In one example, first image data 121A forming scene 124A (i.e., a first region of interest) has a second field of view that is less than the first field of view comprising entire frame 122 of image 120.

System 110 can include machine-readable storage media. In some examples, a machine-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage media can be entirely or in part a temporary memory, meaning that a primary purpose storage media is not long-term storage. Storage media, in some examples, is described as volatile memory, meaning that the memory, does not maintain stored contents when power to system 110 (or the component(s) where storage media are located) is turned off. Examples of volatile memories can include random access memories (RAM), dynamic random-access memories (DRAM), static random-access memories (SRAM), and other forms of volatile memories. In some examples, storage media can also include one or more machine-readable storage media. Storage media can be configured to store larger amounts of information than volatile memory. Storage media can further be configured for long-term storage of information. In some examples, storage media include non-volatile storage elements. Examples of such non-volatile storage elements can include magnetic hard discs, optical discs, flash memories and other forms of solid-state memory, or forms of electrically programmable memories (EPROM) or electrically erasable and programmable (EEPROM) memories. Most generally, storage media is machine-readable data storage capable of housing stored data from a stored data archive.

System 110 can also include one or multiple computer/data processors. In general, the computer/data processors can include any or more than one of a processor, a microprocessor, a controller, a digital signal processor (DSP), an application specific integrated circuit (ASIC), a field-programmable gate array (FPGA), or other equivalent discrete or integrated logic circuitry. System 110 can include other components not expressly disclosed herein but that are suitable for performing the functions of system 110 and associated methods of preprocessing and processing image data and other forms of data. For example, system 110 can include communication means for sending configuration file 114 from storage media at a location distant from gateway 116, such as cloud storage, to gateway 116 for execution/implementation on streaming image data 20.

Camera 112 can be any device capable of collecting image 120, such as any internet-connected camera, USB camera, or other camera that allows access to the video feed through programmatic access. Image 120 can be image data that is captures by camera 112 in any suitable format. Camera 112 can be positioned to provide image 120 displaying entire frame 122 with a first field of view. The first field of view of entire frame 122 of camera 112 can be a wide field of view that shows multiple regions of interest. Image 120, for example, can show a wide field of view of a shelf in a retailer. Product detector 12 may only be interested in scenes 124A-124C that are each a subset of entire frame 122. For example, image 120 may include regions that show empty shelves, walls, product advertisements, etc. Product detector 12 may only be interested in scenes 124A-124C that include image data of products. Camera 112 can collect and transfer image 120 in any resolution or image quality and any format. Camera 112 can send image 120 to gateway 116 over any suitable means, including via the internet, short-range wireless technology, or any other type of wired and/or wireless connection.

Configuration file 114 is an editable file that contains preprocessing parameters that define, among other instructions, how image 120 is to be preprocessed by gateway 116 to create image data 121A-121C. Configuration file 114 can include numerous other instructions for gateway 116, including which camera 112 to connect to (i.e., which camera 112 to receive image 120 from), what portion of entire frame 122 to select to create scenes 124A-124C (i.e., how to crop entire frame 122 to create scenes 124A-124C), and at which endpoint 118 to publish the preprocessed scenes 124A-124C. Configuration file 114 can be edited and sent to gateway 116 for execution in real time (i.e., runtime) such that an editor can revise the preprocessing parameters and those revisions can be applied to scenes 124A-124C at runtime. Configuration file 114 can be an executable program file or have another format for including instructions and conveying information that is then used by gateway 116 to apply the preprocessing to image 120. Additionally, configuration file 114 can be stored in storage media adjacent to and/or part of gateway 116 or in storage media distant from gateway 116, such as in the cloud. Configuration file 114 can be accessible only by one editor or can be accessible by multiple parties, which may include retailers who can edit the preprocessing parameters defined by configuration file 114 to instruct gateway 116 to preprocess one or each of scenes 124A-124C depending on the needs of the retailers, respectively.

Gateway 116 can include a computer processor capable of performing instructions provided by configuration file 114, which can include preprocessing parameters that are to be applied to image 120. Gateway 116 can be a gateway node, edge device, container, virtual machine, or other software and/or hardware able to accept configuration file 114 and perform the instructions therein to apply the preprocessing parameters to image 120. Further, gateway 116 can be within a single computer hardware set up due to virtualization. Gateway 116 can include one or multiple storage media for storing information, such as the preprocessing parameters sent to gateway 116 from configuration file 114 and/or other information like image 120. Gateway 116 can be located at various locations, including adjacent to camera 112 and/or on the same network as camera 112, distant from camera 112 with image 120 being received by gateway 116 from camera 112 via a wired or wireless connection, in the cloud, or at multiple locations. Gateway 116 is in communication with configuration file 114 to accept instructions for applying preprocessing parameters. Additionally, gateway 116 may be configured to contact configuration file 114 to determine if configuration file 114 has been edited. If edited, gateway 116 can perform preprocessing (on image 120 being received) according to the newly edited configuration file 114.

Preprocessing is executed according to preprocessing parameters defined within configuration file 114. Preprocessing can include formatting image 120 to create first image data 121A of a first region of interest with a second field of view that is less than a first field of view of image 120. Preprocessing image 120 can further include applying at least one of the following image edits to image 120: crop, grayscale, contrast, brightness, color threshold, resize, blur, hue saturation value, sharpen, erosion, dilation, Laplacian image processing, Sobel image processing, pyramid up, and pyramid down. These image edits are a nonexclusive list of edits that can be designated in configuration file 114 and performed on image 120 by gateway 116. Preprocessing can include other edits not expressly included in the list of image edits. Similarly, not all of the image edits need to be performed to create image data 121A-121C of each of scenes 124A-124C, and different scenes 124A-124C can include different image edits performed on image 120 by gateway 116. In one example, only crop is performed on image 120 to create first image data 121A of scene 124A, while a different crop and brightness, resize, and dilation are performed on image 120 to create second image data 121B of scene 124B that is different than first image data 121A of scene 124A.

Each of image edits are briefly described as follows. Crop is the removal of unnecessary areas/regions (i.e., regions that are not of-interest to the subscriber) of entire frame 122 having first field of view to create scenes 124A-124C each with second, third, and fourth field of views, respectively. Scenes 124A-124C that have been cropped have fields of view that are a subset of (i.e., less than) first field of view of entire frame 122. Grayscale is the alteration of the color of image data 121A-121C and can include limiting the color to be between white and black. Contrast is the alteration of the difference between the maximum and minimum pixel intensity. Brightness is the alteration in the luminous brightness of image data 121A-121C. Threshold is the alteration of the color of image data 121A-121C by changing the color of select pixels of image data 121A-121C that are above a specified threshold color value. Resize is the alteration of the frame size of image data 121A-121C without cutting/cropping any of the frame out. Blur is the alteration of the clarity of image data 121A-121C, which may be desired for some processing applications, such as an IA model. Hue saturation value (HSV) is assigning a numerical readout of image data 121A-121C that corresponds to the color contained therein. Sharpen is altering image data 121A-121C to make the objects therein appear more defined/sharpened. Erosion is altering image data 121A-121C by shrinking pixels and/or removing pixels on object boundaries, while dilution is the reverse of erosion in that image data 121A-121C is enlarged by resizing pixels and/or adding pixels at object boundaries. Laplacian image processing and Sobel image processing are processing techniques known in the art that can be applied to image data 121A-121C. Pyramid up and pyramid down are altering image data 121A-121C by smoothing and/or subsampling as known in the art. Each of scenes 124A-124C can include these and other image edits to be applied by gateway 116 to preprocess image 120 and output as scenes 124A-124C for use by product detector 12.

The order in which the image edits are performed can be optimized by gateway 116 and/or optimized within configuration file 114 to reduce the amount of time gateway 116 takes to perform preprocessing. This optimization can be done manually by an editor (e.g., the individual with access to edit configuration file 114) or automatically by system 110. For example, depending on which image edits are to be performed in preprocessing by gateway 116, the order of performance of those image edits can be rearranged to reduce the amount of time gateway 116 takes to perform preprocessing. In one example, crop is the first image edit to be performed, followed by other image edits.

For clarity, image 120 is unaltered image data that is received by gateway 116 from camera 112, whereas first image data 121A is image data that has been preprocessed by gateway 116 (according to preprocessing parameters defined in configuration file 114) to create scene 124A. Similarly, second image data 121B is image data that has been preprocessed to create scene 124B, and third image data 121C is image data that has been preprocessed to create scene 124C. For each of first, second, and third image data 121A-121C, the originating image data is image 120. Each of scenes 124A-124C can be a subset of entire frame 122 and show second, third, and fourth fields of view, respectively, that are less than the first field of view of entire frame 122. However, other scenes can have the same field of view as first field of view of entire frame 122 and instead other editing is performed on that scene besides cropping; for example, that scene can be edited to be in grayscale whereas entire frame 122 of image 120 is in color.

Gateway 116 can be in communication with endpoint 118 to which gateway 116 publishes the preprocessed image data 121A-121C (e.g., scenes 124A-124C). The communication can be wired or wireless, such as communication via the internet. However, endpoint 118 can be at the same location as gateway 116 or on the same computer hardware set up and/or network. For example, gateway 116 can host endpoint 118 on which gateway 116 publishes the preprocessed image data 121A-121C (e.g. scenes 124A-124C). Endpoint 118 can be hosted by gateway 116 to which product detector 12 can connect. Further, endpoint 118 can be located on the internet with a unique address and/or security protocol that allows for subscription and access to scenes 124A, 124B, and 124C. Scenes 124A, 124B, and 124C can be published to endpoint 118 using an asynchronous messaging library, for example ZeroMQ, such that scenes 124A, 124B, and 124C are published as topic 1, topic 2, and topic 3, respectively. Product detector 12 can subscribe to any of topics 1-3 to receive image data 121A-121C of scenes 124A, 124B, 124C, respectively. Gateway 116 can publish image data 121A-121C of each of scenes 124A-124C to endpoint 118 in any format suitable for use by product detector 12. For example, image data 121A-121C can each be published in any suitable image format. The format that image data 121A-121C of each of scenes 124A-124C can be designated in configuration file 114 and applied to image data 121A-121C by gateway 116.

Each scene 124A-124C at topics 1-3, respectively, can be subscribed to by product detector 12. Image data 121A-121C of each of scenes 124A-124C can be further processed by product detector 12, respectively, depending on the desired inference to be determined from image data 121A-121C. For example, first image data 121A of scene 124A can be further processed by an AI model to detect what products are present in image 120 from camera 112.

Scene selection and preprocessing system 110 can be used to preprocess images taken by product sources 14 or retailers 16, as discussed above in references to FIGS. 1-6. The images taken by product sources 14 are used to create annotation packages to train product detector 12 to detect products. Preprocessing those images can ensure that the images are clear and properly cropped for accurate training of product detector 12. Further, the images taken by retailers 16 are used to detect what products are present in the stores of retailers 16. Preprocessing those images can ensure that the images are clear and properly cropped for accurate product detection with product detector 12. For example, if an image of products on a shelf shows the floor of the store in part, the floor can be cropped out using scene selection and preprocessing system 110 before product detector 12 analyzes the image. This saves resources, as product detector 12 does not have to analyze portions of images where it is known that products are not located.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of obtaining images and data to train an AI model for product detection, the method comprising:
   generating, with an image collection system at a first product source, a first annotation package including one or more images of and data about a first product, further comprising:
      placing the first product in a first enclosure located at the first product source;
      initiating, in the first enclosure, a process for obtaining the one or more images of the first product;
      obtaining the one or more images of the first product with one or more cameras positioned in the first enclosure;
      providing the one or more images of the first product to an edge compute device;
      inputting, using an input device, data about the first product into the edge compute device;
      creating an annotation package for the first product that includes the one or more images and the data;
   generating, with an image collection system at a second product source, a second annotation package including one or more images of and data about a second product;
   providing, from the first product source, the first annotation package to a product detector;
   providing, from the second product source, the second annotation package to the product detector;
   training an artificial intelligence model to detect the first product based on the first annotation package and to detect the second product based on the second annotation package, wherein the artificial intelligence model is implemented on the product detector;
   receiving, at the product detector from a first retailer, a first image;
   detecting, by executing the artificial intelligence model, the first product and/or the second product in the first image;
   receiving, at the product detector from a second retailer, a second image; and
   detecting, by executing the artificial intelligence model, the first product and/or the second product in the second image.

2. The method of claim 1, wherein obtaining one or more images of the first product with one or more cameras further comprises:
   obtaining a first image of a first field of view of the first product with a first camera;
   obtaining a second image of a second field of view of the first product with a second camera;
   obtaining a third image of a third field of view of the first product with a third camera; and
   obtaining a fourth image of a fourth field of view of the first product with a fourth camera;
   wherein the first field of view, the second field of view, the third field of view, and the fourth field of view are different.

3. The method of claim 1, and further comprising:
   illuminating one or more rows of LEDs positioned in the first enclosure.

4. The method of claim 3, wherein the one or more rows of LEDs are selectively illuminated based on what camera is capturing an image.

5. The method of claim 3, wherein illuminating one or more rows of LEDs positioned in the first enclosure further comprises:
illuminating a first row of LEDs positioned in a first corner of the first enclosure;
obtaining a first image of a first field of view of the first product with a first camera positioned in the first corner of the first enclosure;
illuminating a second row of LEDs positioned in a second corner of the first enclosure;
obtaining a second image of a second field of view of the first product with a second camera positioned in the second corner of the first enclosure;
illuminating a third row of LEDs positioned in a third corner of the first enclosure;
obtaining a third image of a third field of view of the first product with a third camera positioned in the third corner of the first enclosure; and
illuminating a fourth row of LEDs positioned in a fourth corner of the first enclosure;
obtaining a fourth image of a fourth field of view of the first product with a fourth camera positioned in the fourth corner of the first enclosure;
wherein the first field of view, the second field of view, the third field of view, and the fourth field of view are different.

6. The method of claim 3, and further comprising:
displaying, on a display of the edge compute device, the one or more images of the first product;
determining, by a user, whether the one or more images clearly show the first product;
upon determining that the one ore more images clearly show the first product, creating the first annotation package for the first product; and
upon determining that the one or more images do not clearly show the first product, sending instructions to the first enclosure to adjust illumination of the one or more rows of LEDs.

7. The method of claim 6, wherein the instructions sent to the first enclosure to adjust the illumination of the one or more rows of LEDs can be stored as a template for obtaining images of the first product.

8. The method of claim 3, wherein illuminating the one or more rows of LEDs positioned in the first enclosure further comprises:
selecting a preset lighting scheme based on a quality of the first product; and
illuminating the one or more rows of LEDs positioned in the first enclosure according to the preset lighting scheme.

9. The method of claim 1, wherein generating, with the image collection system at the second product source, the second annotation package including one or more images of and data about the second product further comprises:
placing the second product in a second enclosure located at the second product source;
initiating, in the second enclosure, a process for obtaining the one or more images of the second product;
obtaining one or more images of the second product with one or more cameras positioned in the second enclosure;
providing the one or more images of the second product to an edge compute device;
inputting, using an input device, data about the second product into the edge compute device;
creating an annotation package for the second product that includes the one or more images and the data.

10. The method of claim 1, and further comprising:
generating, with the image collection system at the first product source, a third annotation package including one or more images of and data about a third product; and
providing, from the first product source, the third annotation package to the product detector.

11. The method of claim 1, wherein detecting, by executing the artificial intelligence model, the first product and/or the second product in the first image includes detecting the first product in the first image, and further comprising:
categorizing, at the product detector, the first product into a first category of products and the second product into a second category of products;
receiving, at the product detector from the first retailer, a subscription to one of:
the first category of products;
the second category of products; and
the first category and the second category of products;
identifying that the first product is in the first category;
determining if the retailer is subscribed to the first category;
sending, in response to determining that the retailer is subscribed to the first category, an inference to the retailer including an indication of the first product; and
sending, in response to determining that the retailer is not subscribed to the first category, a notification to the retailer that the first product is in the first category the retailer is not subscribed to.

12. The method of claim 1, wherein detecting, by executing the artificial intelligence model, the first product and/or the second product in the first image further comprises:
sending the first image from the first retailer to an artificial intelligence model service via a gateway at the first retailer;
executing the artificial intelligence model in the artificial intelligence model service to detect the first product and/or the second product in the first image; and
sending, from the artificial intelligence model service, an inference or a notification to the first retailer.

13. The method of claim 12, wherein sending, from the artificial intelligence model service, the inference or the notification to the first retailer further comprises:
sending the inference or the notification to an output device via the gateway at the first retailer.

14. The method of claim 1, wherein detecting, by executing the artificial intelligence model, the first product and/or the second product in the first image further comprises:
sending the artificial intelligence model to a gateway at the first retailer;
storing the artificial intelligence model on the gateway;
sending the first image to the gateway;
executing the artificial intelligence model on the gateway to detect the first product and/or the second product in the first image; and
sending, from the gateway, an inference or a notification to an output device.

15. The method of claim 1, and further comprising:
preprocessing the one or more images of the first product, by a computer processor, according to preprocessing parameters defined within a runtime configuration file, wherein the preprocessing includes formatting the one or more images to create first image data of a first region of interest with a second field of view that is less than a first field of view of each of the one or more images.

16. The method of claim 15, wherein the step of preprocessing the one or more images of the first product includes applying at least one of the following edits to the one or more images: crop, grayscale, contrast, brightness, color threshold, resize, blur, hue saturation value, sharpen, erosion, dilation, Laplacian image processing, Sobel image processing, pyramid up, and pyramid down.

17. The method of claim 1, and further comprising:
preprocessing the first image from the first retailer, by a computer processor, according to preprocessing parameters defined within a runtime configuration file, wherein the preprocessing includes formatting the first image to create first image data of a first region of interest with a second field of view that is less than a first field of view of the first image.

18. The method of claim 17, wherein the step of preprocessing the first image from the first retailer includes applying at least one of the following edits to the first image: crop, grayscale, contrast, brightness, color threshold, resize, blur, hue saturation value, sharpen, erosion, dilation, Laplacian image processing, Sobel image processing, pyramid up, and pyramid down.

* * * * *